United States Patent
Miyano

(10) Patent No.: US 8,537,520 B2
(45) Date of Patent: Sep. 17, 2013

(54) SEMICONDUCTOR DEVICE AND METHOD OF CONTROLLING ELECTROSTATIC ACTUATOR

(75) Inventor: Shinji Miyano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 98 days.

(21) Appl. No.: 13/237,619

(22) Filed: Sep. 20, 2011

(65) Prior Publication Data

US 2012/0007527 A1  Jan. 12, 2012

Related U.S. Application Data

(62) Division of application No. 12/391,624, filed on Feb. 24, 2009, now Pat. No. 8,035,949.

(30) Foreign Application Priority Data

Feb. 25, 2008  (JP) .................................. 2008-042908

(51) Int. Cl.
*H01G 4/02* (2006.01)
*H02N 1/00* (2006.01)

(52) U.S. Cl.
USPC .......................................... 361/271; 318/116

(58) Field of Classification Search
USPC ......... 361/271, 281, 277, 280, 207; 200/181; 310/309
See application file for complete search history.

(56) References Cited

U.S. PATENT DOCUMENTS

| | | | |
|---|---|---|---|
| 5,578,976 A | | 11/1996 | Yao |
| 6,046,659 A | * | 4/2000 | Loo et al. ...................... 333/262 |
| 6,667,245 B2 | * | 12/2003 | Chow et al. .................... 438/723 |
| 6,853,476 B2 | | 2/2005 | Martin et al. .................. 359/290 |
| 7,343,655 B2 | * | 3/2008 | Mehta .......................... 29/25.35 |
| 7,675,393 B2 | * | 3/2010 | Kawakubo et al. ............. 335/78 |
| 8,274,200 B2 | * | 9/2012 | Zhang et al. .................. 310/330 |
| 2006/0285255 A1 | * | 12/2006 | Kawakubo et al. ........... 360/294 |
| 2007/0181411 A1 | | 8/2007 | Ikehashi et al. ............... 200/181 |
| 2009/0072630 A1 | | 3/2009 | Miyazaki ....................... 307/138 |
| 2009/0121662 A1 | | 5/2009 | Miyazaki ....................... 318/116 |
| 2009/0320557 A1 | | 12/2009 | Sammoura et al. .................. 73/9 |

FOREIGN PATENT DOCUMENTS

JP   2007-242607   9/2007

OTHER PUBLICATIONS

Gabriel M. Rebeiz, "RF MEMS Theory, Design, and Technology", Wiley-Interscience, 2003, 5 pages.
Japanese Office Action issued Mar. 21, 2012, in Patent Application No. 2008-042908 (with English-language translation).

* cited by examiner

*Primary Examiner* — Rexford Barnie
*Assistant Examiner* — Angela Brooks
(74) *Attorney, Agent, or Firm* — Oblon, Spivak, McClelland, Maier & Neustadt, L.L.P.

(57) ABSTRACT

A semiconductor device applies a hold voltage Vhold to an upper electrode of an electrostatic actuator and a ground voltage to a lower electrode. After the semiconductor device sets the voltage of the lower electrode to a test voltage Vtest, it eliminates the hold voltage Vhold from the upper electrode and places the voltage of the upper electrode in a high impedance state. The potential difference between the upper electrode and the lower electrode is set to Vhold−Vtest=Vmon. Thereafter, the voltage of the lower electrode is returned to the ground voltage. Whether the electrostatic actuator is placed in an open state or in a closed state is determined by measuring the capacitance between the electrodes based on the amount of drop of the voltage of the upper electrode due to capacitance coupling at the time.

8 Claims, 5 Drawing Sheets

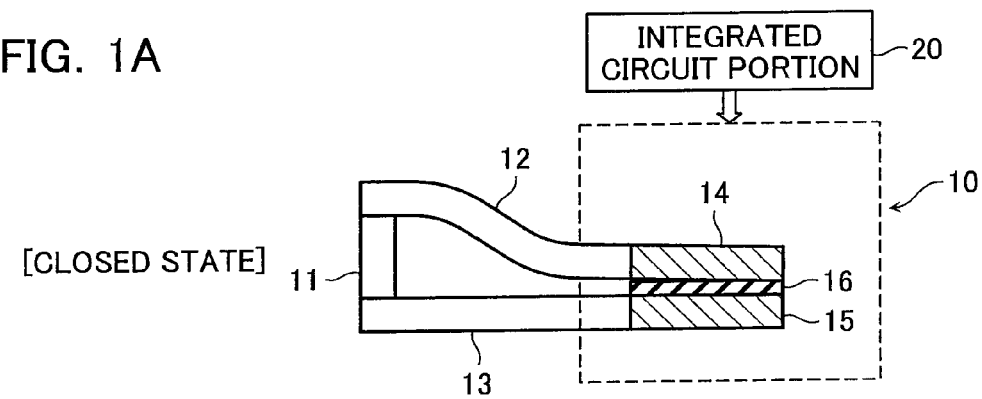
FIG. 1A [CLOSED STATE]
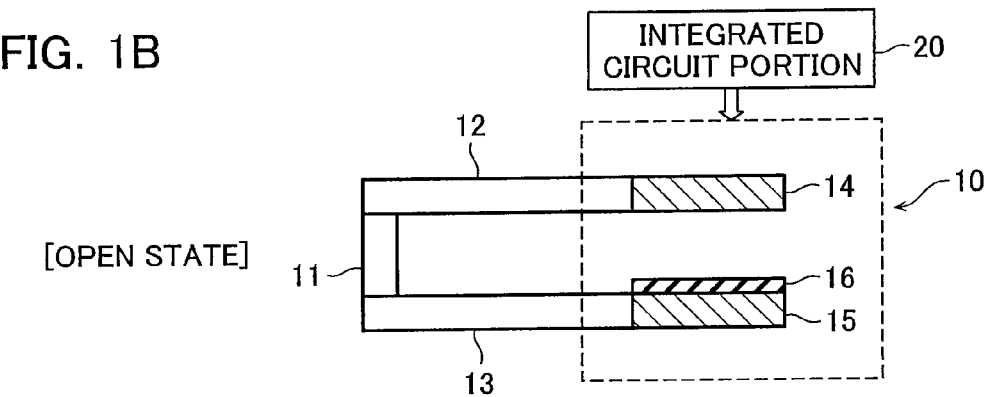
FIG. 1B [OPEN STATE]
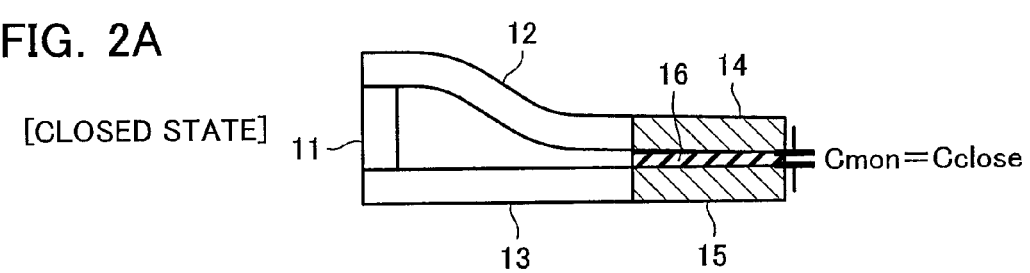
FIG. 2A [CLOSED STATE]
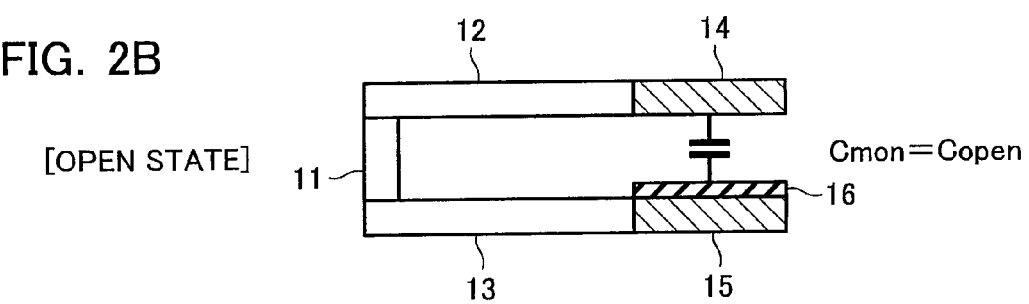
FIG. 2B [OPEN STATE]

SEMICONDUCTOR DEVICE AND METHOD OF CONTROLLING ELECTROSTATIC ACTUATOR

CROSS-REFERENCE TO RELATED APPLICATIONS

The Application is a divisional of application Ser. No. 12/391, 624, filed Feb. 24, 2009 and claims the benefit of priority from Japanese Patent Application No. 2008-042908 filed on Feb. 25, 2008, each of which are expressly incorporated herein by reference in their entireties.

BACKGROUND OF THE INVENTION

1. Field of the Invention

The present invention relates to a semiconductor device controlling an electrostatic actuator using MEMS (Micro Electro Mechanical Systems) and to a method of controlling the electrostatic actuator.

2. Description of the Prior Art

Attention is paid to MEMS as one of technologies for reducing the size, weight, and power consumption of recent electronic equipment and for sophisticating the function thereof. The MEMS is a system in which a minute mechanical element is combined with an electronic circuit element by a silicon process technology.

U.S. Pat. No. 5,578,976, for example, discloses a structure of an electrostatic actuator using the MEMS technology. To place an electrostatic actuator in a closed state (state in which an upper electrode is in contact with a lower electrode through an insulation film), a potential difference is applied between the upper electrode and the lower electrode so that electrostatic attraction between the electrodes exceeds the elastic force of a movable portion to which the upper electrode is fixed.

In the electrostatic actuator in the closed state as described above, since the upper electrode is in contact with the lower electrode through the insulation film, the capacitance between the upper electrode and the lower electrode is larger than that when the electrostatic actuator is placed in an open state. At the time, a charge may be injected into the insulation film and the insulation film may be trapped by the FN (Fowler-Nordheim) tunnel or the Pool-Frenkel mechanism. This phenomenon is called dielectric charging of an electrostatic actuator.

When the amount of charge trapped by the insulation film by the dielectric charging is set to a value larger than a certain value, even if the potential difference between the upper electrode and the lower electrode is set to 0 V, since the upper electrode is attracted to the charge in the insulation film, the electrostatic actuator can not be shifted from the closed state to the open state. This phenomenon is called stiction due to the dielectric charging.

Although a means for avoiding the stiction is also disclosed in, for example, Non-Patent Document 1, G. M. Rebeiz, "RF MEMS Theory, Design, and Technology," Wiley-Interscience, 2003, pp, 190-191, it is difficult to completely eliminate the amount of charge trapped by an insulation film and to completely excluding charging. Accordingly, there is desired a semiconductor device which can simply and accurately determine a state of an electrostatic actuator including whether or not charging is generated and which promptly restores to a normal operation state when it is determined that the charging and the like are generated to the electrostatic actuator.

SUMMARY OF THE INVENTION

In a semiconductor device according to an aspect of the present invention for controlling an electrostatic actuator having a first electrode and a second electrode formed such that they come close to each other when the electrostatic actuator is shifted from an open state to a closed state by electrostatic attraction against elastic force, the device comprising: a voltage generation unit generating, at least, as voltages to be applied between the first electrode and the second electrode, an operation voltage for shifting the electrostatic actuator from the open state to the closed state, a hold voltage equal to or lower than the operation voltage used for keeping the electrostatic actuator in the closed state, a monitor voltage lower than the hold voltage used for determining whether or not a charge to the first electrode or the second electrode is trapped thereto, and a separation voltage having characteristics opposite to those of the operation voltage for shifting the electrostatic actuator from the closed state to the open state; a capacitance detection unit detecting the capacitance between the first electrode and the second electrode; and a controller performing a control for applying a voltage generated by the voltage generation unit between the first electrode and the second electrode, the controller causing the capacitance detection unit to detect the capacitance between the first electrode and the second electrode, when the voltage between the first electrode and the second electrode is switched from the hold voltage to the monitor voltage for a certain period of time, whereas applying the separation voltage between the first electrode and the second electrode when the capacitance is equal to or larger than a certain value.

In a semiconductor device according to another aspect of the present invention for controlling an electrostatic actuator having a first electrode and a second electrode formed such that they come close to each other when the electrostatic actuator is shifted from an open state to a closed state by electrostatic attraction against elastic force, the device comprising: a voltage generation unit generating, at least, as voltages to be applied between the first electrode and the second electrode, an operation voltage for shifting the electrostatic actuator from the open state to the closed state, a hold voltage equal to or lower than the operation voltage used for keeping the electrostatic actuator in the closed state, a monitor voltage lower than the hold voltage used for determining whether or not a charge to the first electrode and the second electrode is trapped thereto, and a separation voltage having characteristics opposite to those of the operation voltage for shifting the electrostatic actuator from the closed state to the open state; a capacitance detection unit detecting the capacitance between the first electrode and the second electrode; and a controller performing a control for applying a voltage generated by the voltage generation unit between the first electrode and the second electrode, the controller causing the capacitance detection unit repeatedly to detect the capacitance between the first electrode and the second electrode, when the voltage between the first electrode and the second electrode is switched from the hold voltage to the monitor voltage for a certain period of time, whereas changing the magnitude of the monitor voltage when the capacitance is equal to or larger than a certain value, and applying the monitor voltage again between the first electrode and the second electrode until the capacitance is made less than a certain value.

A method of controlling an electrostatic actuator according to an aspect of the present invention having a first electrode and a second electrode formed such that they come close to each other when the electrostatic actuator is shifted from an open state to a closed state by electrostatic attraction against elastic force comprising: applying an operation voltage between the first electrode and the second electrode to shift the electrostatic actuator from the open state to the closed state; applying a hold voltage equal to or less than the operation voltage between the first electrode and the second electrode to keep the closed state of the electrostatic actuator; applying a monitor voltage smaller than the hold voltage between the first electrode and the second electrode to determine a trap state of a charge to the first electrode and the second electrode; detecting a capacitance between the first electrode and the second electrode when a voltage between the first electrode and the second electrode is switched from the hold voltage to the monitor voltage; and performing a predetermined operation based on a result of detection of the capacitance.

BRIEF DESCRIPTION OF THE DRAWINGS

FIG. 1A is schematic view showing an overall arrangement of a semiconductor device according to a first embodiment;

FIG. 1B is schematic view showing an overall arrangement of a semiconductor device according to a first embodiment;

FIG. 2A is conceptual view explaining an electrostatic actuator;

FIG. 2B is conceptual view explaining an electrostatic actuator;

Figure 3:
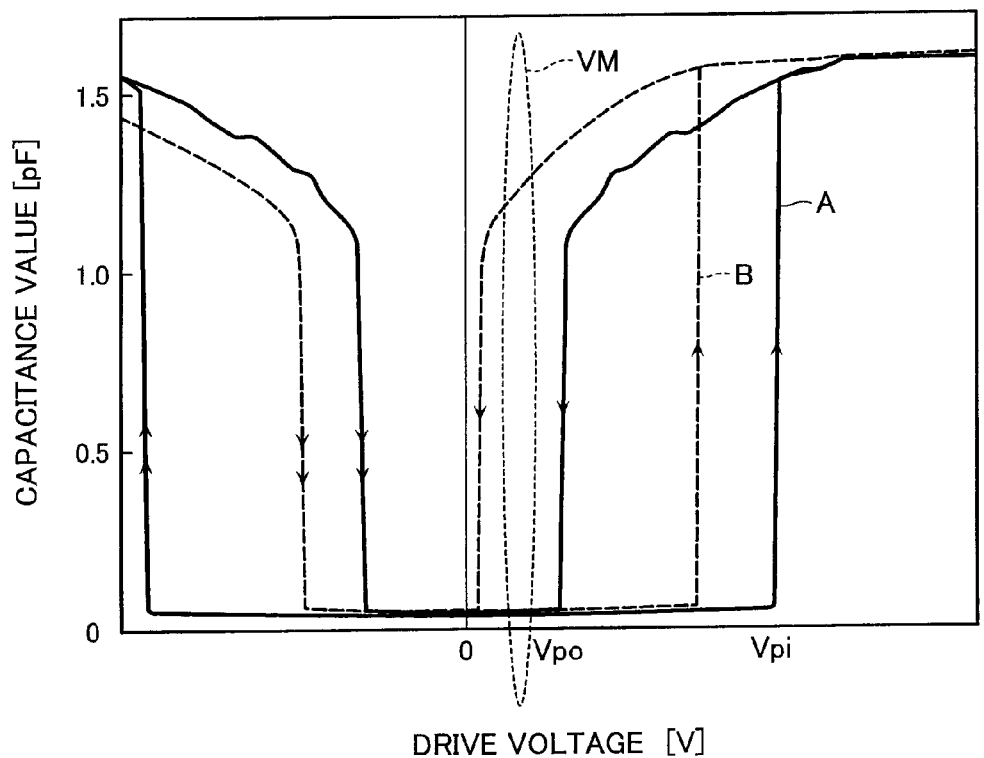
FIG. 3 is an explanatory view explaining C-V characteristics in the electrostatic actuator.

The accompanying drawings, which are incorporated in and constitute a part of the specification, illustrate embodiments of the invention, and together with the general description given above and the detailed description of the embodiments given below, serve to explain the principles of the invention.

DESCRIPTION OF THE PREFERRED EMBODIMENTS

Embodiments of the present invention will be explained in detail referring to the drawings.

First Embodiment

FIGS. 1A and 1B are schematic views showing an overall arrangement of a semiconductor device according to a first embodiment of the present invention.

The semiconductor device according to the first embodiment is consisted of an electrostatic actuator 10 employing an electrostatic system as shown in, for example, FIGS. 1A and 1B and an integrated circuit portion 20 for controlling it. The electrostatic actuator 10 has a well-known structure and a feature of the first embodiment resides in an arrangement of the integrated circuit portion 20. Note that the electrostatic actuator 10 and the integrated circuit portion 20 may be formed on one silicon substrate by the MEMS technology or each of the electrostatic actuator 10 and the integrated circuit portion 20 may be formed on a different silicon substrate.

First, the structure of the electrostatic actuator 10 will be explained referring to FIGS. 1A and 1B. FIG. 1A shows a closed state of the electrostatic actuator 10 (state in which an upper electrode 14 is in contact with a lower electrode 15 via an insulation film 16), and FIG. 1B shows an open state of the electrostatic actuator 10 (state in which the upper electrode 14 is away from the lower electrode 15).

As shown in FIGS. 1A and 1B, the electrostatic actuator 10 has a beam portion 11 fixed to a not-shown substrate (silicon substrate and the like), a movable portion 12 movable to the beam portion 11, a fixed portion 13 fixed to the beam portion 11, the upper electrode 14 fixed to the movable portion 12, the lower electrode 15 fixed to the fixed portion 13, and an insulation film 16 formed on the front surface of the lower electrode 15. The upper electrode 14 and the lower electrode 15 are supplied with a voltage necessary for operation from the integrated circuit portion 20.

To shift the electrostatic actuator 10 arranged as described above from an open state to a closed state, an operation voltage Vact and a hold voltage Vhold are applied between the upper electrode 14 and the lower electrode 15, so that the electrostatic attraction between the electrodes 14 and 15 exceeds the elastic force of the movable portion 12 to which the upper electrode 14 is fixed.

In the electrostatic actuator 10 in the closed state, the upper electrode 14 is in contact with the lower electrode 15 via the insulation film 16. As shown in FIG. 2A, the capacitance Cmon=Cclose between both the electrodes 14 and 15 is set larger than the capacitance Cmon=Copen in the open state as shown in FIG. 2B.

In the closed state, a charge can be injected into the insulation film 16 and trapped by the FN tunnel or the Pool-Frenkel mechanism (dielectric charging). When the amount of the charge trapped by the insulation film 16 by the dielectric charging sufficiently increases, even if the potential difference between the upper electrode 14 and the lower electrode 15 is set to 0V, since the upper electrode 14 is attracted to the charge in the insulation film 16, it cannot be shifted from the closed state to the open state (stiction).

FIG. 3 shows C-V characteristics in the electrostatic actuator 10 (relation between a drive voltage and a capacitance between the upper electrode 14 and the lower electrode 15). In the semiconductor device according to the first embodiment, initial C-V characteristics at the time when, for example, a drive voltage is applied to the upper electrode 14 and a ground voltage Vss (not shown) is applied to the lower electrode 15, change as shown by a C-V characteristics line (solid line) A. Further, the C-V characteristics after both the electrodes 14 and 15 open and close a predetermined number of times in the same condition change as shown by a C-V characteristics line (broken line) B. More specifically, the characteristics line B shifts to the left in its entirety when viewed from the characteristics line A.

After both the electrodes 14 and 15 open and close the predetermined number of times, a pull-in voltage (voltage by which the electrodes 14 and 15 in the open state come into contact with each other) Vpi, and a pull-out voltage (voltage by which the electrodes 14 and 15 in the closed state are away from each other) Vpo shift in a decreasing direction as apparent from the C-V characteristics lines A, B. Accordingly, a region VM, in which a monitor voltage Vmon (not shown) monitored by the semiconductor device is set, must be ordinarily set to a value smaller than the value of the pull-out voltage Vpo in the C-V characteristics line A.

However, the insulation film 16 between the electrodes 14 and 15 may be made thinner, in order to increase the capacitance per unit area of the variable capacitor in the electrostatic actuator. In this case, as apparent also from the C-V characteristics line B, the value of the pull-out voltage Vpo tends to decrease. Additionally, after both the electrodes 14 and 15 open and close certain number of times as described above, the value of the pull-out voltage Vpo also tends to decrease.

Figure 4:
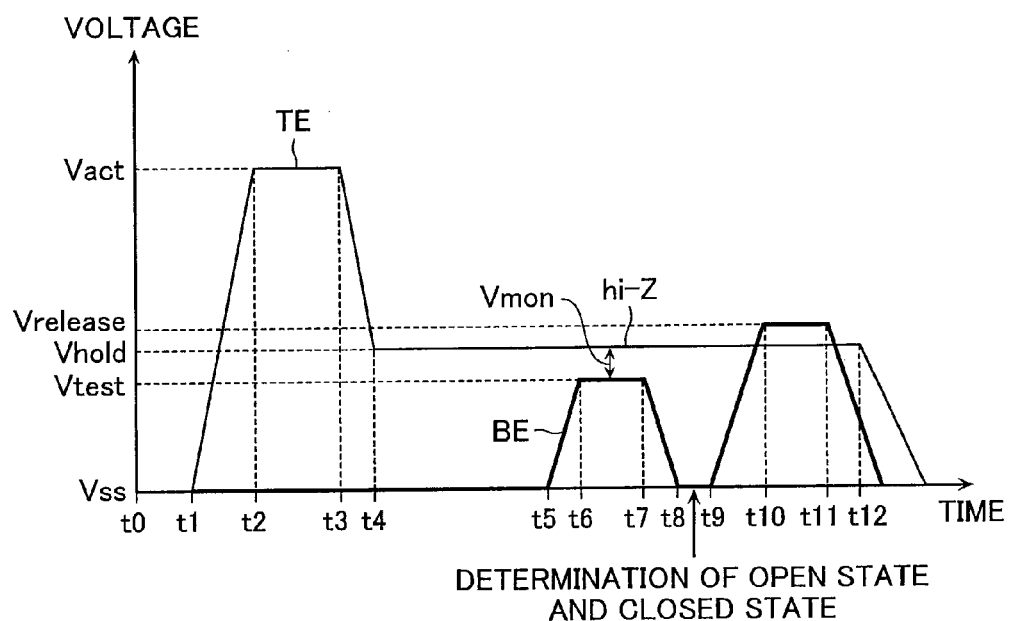
FIG. 4 is a waveform chart explaining an example of a waveform of a voltage applied to the electrostatic actuator in the first embodiment.
Figure 5:
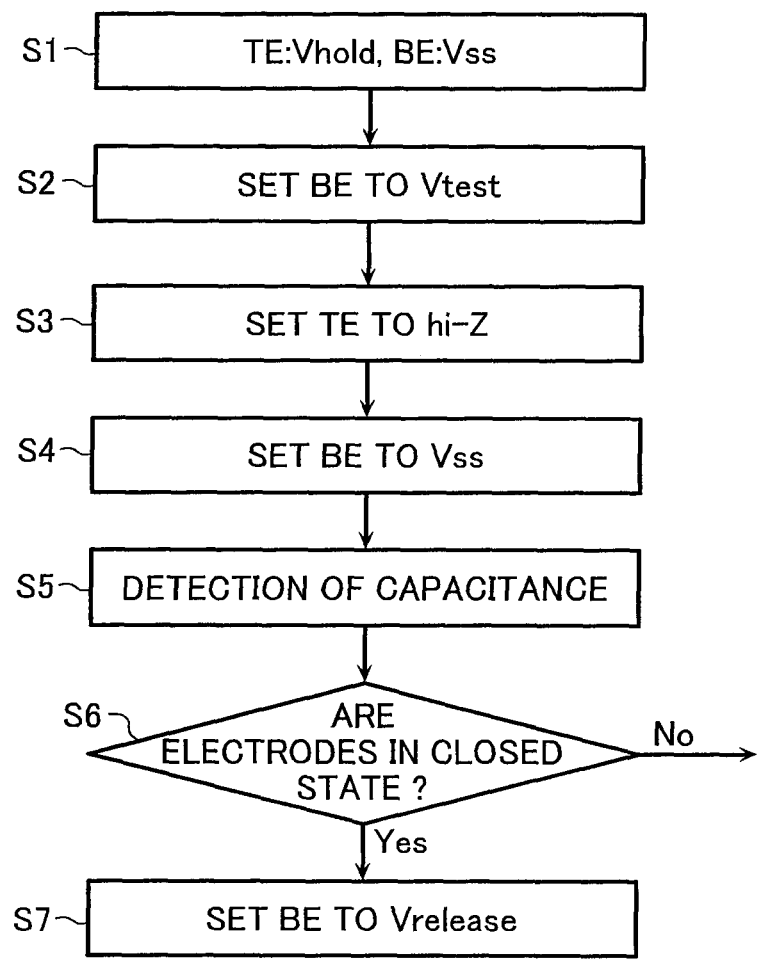
FIG. 5 is a flowchart showing an operation of the semiconductor device according to the first embodiment.

Thus, in the semiconductor device according to the first embodiment, a voltage TE (thin line) and a voltage BE (thick line) are applied to the upper electrode 14 and the lower electrode 15, respectively, at timings shown in FIG. 4. FIG. 5 is a flowchart showing a procedure of control processes of the electrostatic actuator 10 performed by the semiconductor device and shows the procedure of the processes particularly relating to the embodiment in the timings shown in FIG. 4.

As shown in FIG. 4, specifically, at time t0, the upper electrode is given a ground voltage Vss as the voltage TE. Then, at time t1, for example, a high operation voltage Vact is first applied to the upper electrode 14. With this operation, the electrostatic actuator 10 is shifted from the open state to the closed state against the elastic force. At the time, the voltage BE of the lower electrode 15 remains in the ground voltage Vss.

Then, at time t3, the voltage TE to be applied to the upper electrode 14 is switched to the hold voltage Vhold lower than the operation voltage Vact while keeping the voltage BE to the ground voltage Vss (step S1). The voltage TE abruptly drops to the hold voltage Vhold between time t3 and t4. At this time, the electrostatic actuator 10 remains in the closed state.

Note that the period of time from time t1 to time t4 is, for example, 20 μs (microseconds) to 30 μs, and the period of time from time t2 to time t3 is, for example, 10 μs.

Thereafter, at time t5, for example, a test voltage Vtest (>Vss) is applied to the lower electrode 15. Before time t5, the voltage BE is the ground voltage Vss. Then, the voltage BE abruptly rises between time t5 to time t6 and is set to the test voltage Vtest (step S2).

The potential difference between the hold voltage Vhold of the voltage TE at this time and the test voltage Vtest of the voltage BE is the monitor voltage Vmon, and the electrostatic actuator 10 remains in the closed state or is shifted to the open state depending on the degree of charging. More specifically, the monitor voltage Vmon is insufficient to keep the closed state of the electrostatic actuator 10 when no charge to the electrostatic actuator 10 is trapped. The degree of the charge trapped by the electrostatic actuator 10 can be determined by applying the monitor voltage Vmon between both the electrodes 14 and 15 in a short period of time.

Then during the period of time from time t6 to t7, the upper electrode 14 of the electrostatic actuator 10 is separated from the hold voltage Vhold. This causes the voltage TE to become a high impedance state (hi-Z) (step S3).

Further, the ground voltage Vss is applied to the lower electrode 15 at this time t7 to which the test voltage Vtest is applied. Then, the voltage BE abruptly drops between time t7 to time t8 and is set to the ground voltage Vss (step S4). At this time, since the voltage TE is placed in the high impedance state (hi-Z), it is dropped by the capacitance coupling between the voltage TE and the voltage BE. When the distance between both the electrodes 14 and 15 is short (when they are closed), the voltage TE is dropped in a large amount because the capacitance is large, whereas when the distance therebetween is long (when they are opened), the voltage TE is dropped in a small amount because the capacitance is small.

Whether or not the electrostatic actuator 10 is placed in the open state or in the closed state is determined by measuring the capacitance between both the electrodes 14 and 15 based on the amount of drop of the voltage TE.

The capacitance of the electrostatic actuator 10 is measured (detected) to determine whether the electrostatic actuator 10 is placed in the open state or in the closed state between time t8 at which the voltage BE is set to the ground voltage Vss and time t9 (step S5).

Since the amount of drop of the electric potential is determined depending on the magnitude of the capacitance of the electrostatic actuator 10 at step S5, the capacitance between the upper electrode 14 and the lower electrode 15 of the electrostatic actuator 10 is measured (detected) by measuring the amount of drop of the electric potential. Whether or not the upper electrode 14 and the lower electrode 15 are, for example, opened or closed is determined by the measured capacitance (step S6).

More specifically, when the amount of drop is large at step S6 because the capacitance is large, it can be determined that the electrostatic actuator 10 is placed in the closed state. On the contrary, when the amount of drop is small because the capacitance is small, it can be determined that the electrostatic actuator 10 is shifted to the open state. More specifically, whether the electrostatic actuator 10 is placed in the open state or in the closed state can be determined based on the amount of the drop.

When it is determined that the upper electrode 14 and the lower electrode 15 are not closed (step S6: No), the electrostatic actuator 10 can continue an ordinary operation thereafter. In contrast, when it is determined that the upper electrode 14 and the lower electrode 15 are closed (step S6: Yes), a release voltage Vrelease which is higher than the hold voltage Vhold is applied to the voltage BE of the lower electrode 15 which is set to the ground voltage Vss at, for example, time t9 (step S7).

With this operation, the voltage BE abruptly rises and becomes the release voltage Vrelease between time t9 to time t10, for example, and a voltage (separation voltage) having characteristics (negative magnitude) opposite to those of the operation voltage Vact and the hold voltage Vhold is applied between both the electrodes 14 and 15. The electrostatic actuator 10 can be shifted from the closed state to the open state regardless of a dielectric charging state as well as the charge trapped by the insulation film 16 can be discharged by the method. With this operation, the stiction of the electrostatic actuator 10 can be avoided.

Note that the open state of the electrostatic actuator 10 is continued by switching the voltage BE to the ground voltage Vss at time t11 and switching the voltage TE to the ground voltage Vss at time t12. As apparent from FIG. 3, when the C-V characteristics line A is shifted to the C-V characteristics line B, and the voltage applied to the electrostatic actuator 10 is a reverse-direction voltage (the negative direction of a lateral axis of FIG. 3: when the voltage applied to the upper electrode 14 is smaller than the voltage applied to the lower electrode 15), the absolute value of the pull-out voltage Vpo may be lager. Therefore, it is relatively easy to apply the release voltage Vrelease with an enough margin to the hold voltage Vhold.

Figure 6:
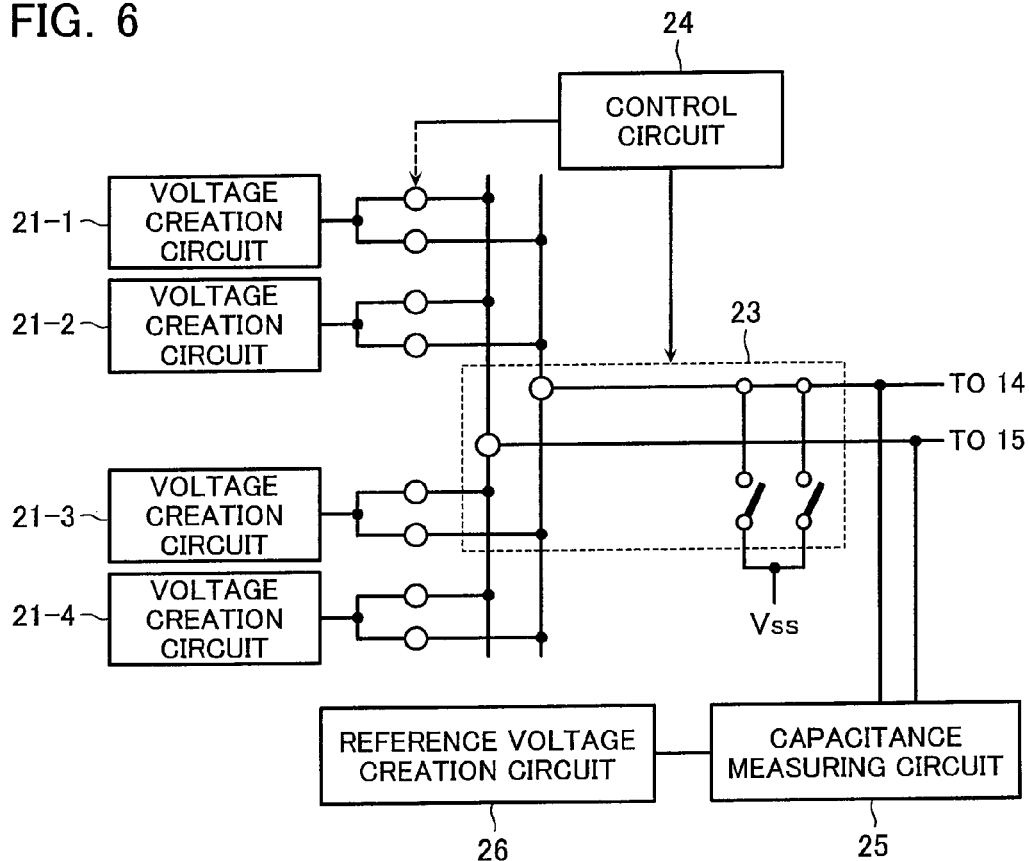
FIG. 6 is a block diagram showing an example of an arrangement of an integrated circuit portion included in the semiconductor device according to the first embodiment.

FIG. 6 is a view showing an example of an arrangement of the integrated circuit portion 20. The integrated circuit portion 20 of the example having the above arrangement has voltage creation circuits 21-1, 21-2, 21-3, 21-4, a switching circuit 23, a control circuit 24, a capacitance measuring circuit 25, and a reference voltage creation circuit 26.

The voltage creation circuit 21-1 creates the operation voltage Vact described above. The voltage creation circuit 21-2 creates the hold voltage Vhold described above which is lower than the operation voltage Vact. The voltage creation circuit 21-3 creates the test voltage Vtest lower than the hold voltage Vhold. The voltage creation circuit 21-4 creates the voltage Vrelease higher than the hold voltage Vhold. Note that the monitor voltage Vmon described above is a voltage shown by the absolute value of the potential difference between the hold voltage Vhold and the test voltage Vtest.

The switching circuit 23 has a function of selectively connecting and supplying the various voltages created by the voltage creation circuits 21-1 to 4 to any one of the upper electrode 14 and the lower electrode 15 and supplying one of the remaining voltages to any other of the upper electrode 14 and the lower electrode 15 as well as a function for appropriately connecting the upper electrode 14 and the lower electrode 15 to the ground voltage Vss. The operations of the voltage creation circuits 21-1 to 4 and the switching circuit 23 are controlled by the control circuit 24.

Further, the capacitance measuring circuit 25 is disposed as a circuit for measuring the voltages of the upper electrode 14 and the lower electrode 15 and measuring the capacitance between the electrodes 14 and 15. The capacitance measuring circuit 25 measures the above voltages by comparing a reference voltage Vref created by the reference voltage creation circuit 26 with the voltage (voltage TE or voltage BE) of the upper electrode 14 or the lower electrode 15.

In the semiconductor device according to the first embodiment, even if charging or stiction occurs, the state of the electrostatic actuator 10 can be simply and accurately determined and restored to a normal state.

Second Embodiment

The semiconductor device according to the first embodiment described above applies the voltage TE and the voltage BE to both the electrodes 14 and 15 at the timings shown in FIG. 4. When it is determined that the electrostatic actuator 10 is placed in the closed state as a result of determination whether it is opened or closed, both the electrodes 14 and 15 are shifted from the closed state to the open state by applying the release voltage Vrelease higher than the hold voltage Vhold applied to the upper electrode 14 to the lower electrode 15. In contrast, a semiconductor device according to a second embodiment of the present invention has, for example, the following features. Note that, in the following explanation, portions which overlap the portions explained above already are denoted by the same reference numerals, and portions other than portions which particularly relate to the second embodiment may not be explained.

More specifically, in the semiconductor device according to the second embodiment, whether an electrostatic actuator 10 is placed in the open state or in the closed state is determined as described above, and when it is determined that the electrostatic actuator 10 is placed in the closed state, after the voltage TE of an upper electrode 14 is dropped near to the ground voltage Vss, the voltage BE of the lower electrode 15 is caused to rise to a voltage a little larger than the ground voltage Vss. With this operation, a separation voltage having characteristics (negative magnitude) opposite to those of the operation voltage Vact and the hold voltage Vhold is applied between both the electrode 14 and an electrode 15. As described above, both the electrodes 14 and 15 can be shifted from the closed state to the open state, the charge trapped by an insulation film 16 can be discharged, and the electrostatic actuator 10 can be restored to the ordinary state. In the second embodiment, a voltage necessary to apply the separation voltage between the electrodes is smaller than that of the first embodiment, a power consumption can be more reduced than that of the first embodiment.

Note that the semiconductor device of the second embodiment has the electrostatic actuator 10 and an integrated circuit portion 20 likewise the semiconductor device according to the first embodiment described above. Since the electrostatic actuator 10 and the integrated circuit portion 20 have the same arrangements as those of the first embodiment, the explanation thereof is omitted.

Figure 7:
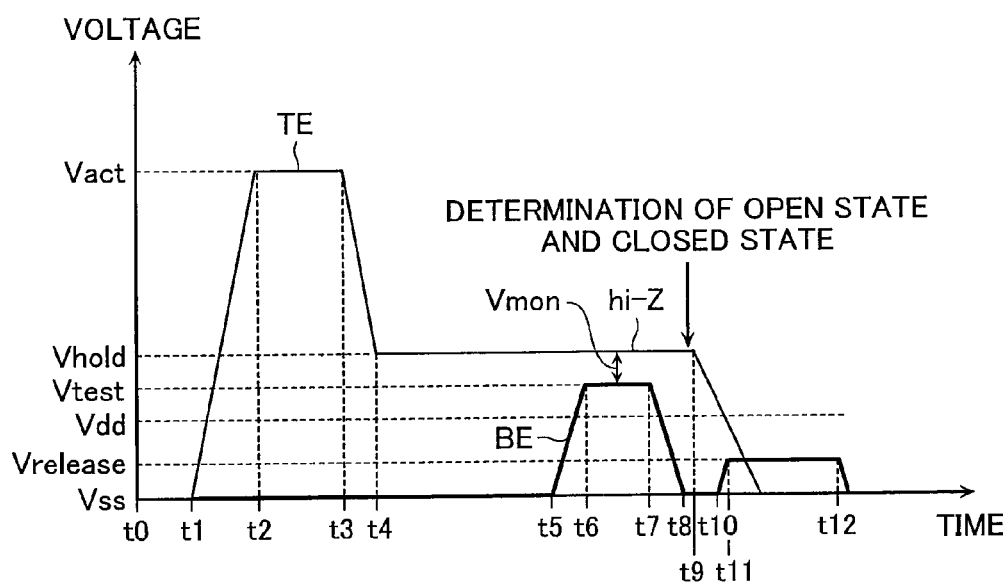
FIG. 7 is a waveform chart explaining an example of a waveform of a voltage applied to an electrostatic actuator in a second embodiment.

FIG. 7 is a view explaining timings at which the voltages are applied to the upper electrode 14 and the lower electrode 15 of the electrostatic actuator 10 in the semiconductor device according to the second embodiment. Note that, in FIG. 7, since the timings at which the voltages are applied in a period of time from time t0 to time t8 are the same as those shown in FIG. 4, explanation will be started here from time t8.

As shown in FIG. 7, at time t8, the voltage TE of the upper electrode 14 is set to the hold voltage Vhold in the high impedance state (hi-Z), and the voltage BE of the lower electrode 15 is set to the ground voltage Vss. Whether or not the electrostatic actuator 10 is placed in the open state or in the closed state is determined by detecting the magnitude of change of the voltage of the upper electrode 14 at time t8.

When it is determined that the electrostatic actuator 10 is placed in the closed state, the voltage TE set to the hold voltage Vhold is switched to the ground voltage Vss at time t9. Thereafter, the release voltage Vrelease, which is lower than the hold voltage Vhold, the test voltage Vtest, and a power supply voltage Vdd (voltage applied from the outside) is applied at time t10 to the lower electrode 15 to which the ground voltage Vss is applied at time t9. The release voltage Vrelease is much smaller than that in the first embodiment.

As a result, the voltage BE abruptly rises, for example, between time t10 and time t11 to the release voltage Vrelease. As described above, the separation voltage having the opposite characteristics is applied between the upper electrode 14 and the lower electrode 15. With this operation, the electrostatic actuator 10 can be shifted from the closed state to the open state by discharging the charge trapped by the insulation film 16. After the electrostatic actuator 10 is shifted to the open state, the open state thereof is continued by applying the ground voltage Vss to the voltage BE at time t12.

Third Embodiment

In the semiconductor devices according to the first and second embodiments described above, the monitor voltage Vmon is applied to both the electrodes 14 and 15 only once by changing the voltage TE and the voltage BE at the timings shown in FIGS. 4 and 7.

In contrast, in a semiconductor device according to a third embodiment of the present invention, the monitor voltage Vmon is applied a plurality of times until it is determined that an electrostatic actuator 10 is placed in the open state. The monitor voltage Vmon is arranged such that the magnitude thereof is changed in a negative direction each time the number of times of application thereof increases. For example, the voltage BE applied to the lower electrode 15 is increased stepwise as the number of times of application of the voltage BE to the lower electrode 15 is increased while keeping the voltage TE applied to the upper electrode 14 to the hold voltage vhold. With this operation, whether the electrostatic actuator 10 is placed in the open state or in the closed state is repeatedly determined each time the monitor voltage Vmon which is changed in the negative direction stepwise is applied.

This point of the third embodiment is different from the first and second embodiments described above.

At first, the monitor voltage Vmon is set to a positive value a little smaller than the hold voltage Vhold and thereafter gradually reduced in the negative direction.

Figure 8:
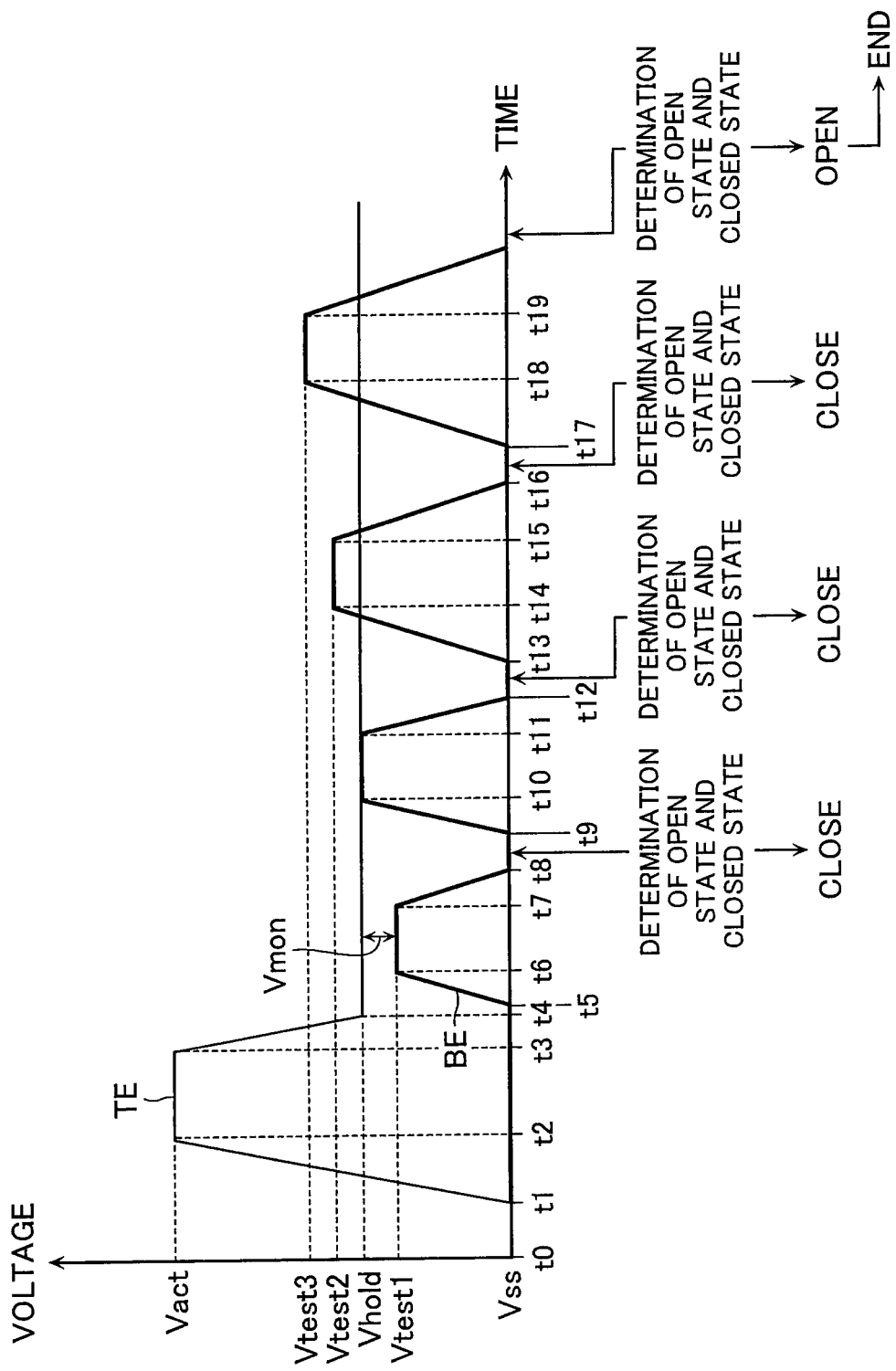
FIG. 8 is a waveform chart explaining an example of a waveform of a voltage applied to an electrostatic actuator in a third embodiment.

FIG. 8 is a view explaining timings at which voltages are applied to an upper electrode 14 and an lower electrode 15 of the electrostatic actuator 10 in the semiconductor device according to the third embodiment. Note that, in FIG. 8, since the timings at which the voltages are applied during a period of time from time t0 to time t4 are the same as those shown in FIGS. 4 and 7, explanation will be started here from time t4.

As shown in FIG. 8, at time t4, for example, since the voltage TE of the upper electrode 14 is set to the hold voltage Vhold and the voltage BE of the lower electrode 15 is set to the ground voltage Vss, the electrostatic actuator 10 is placed in the closed state by the potential difference between these voltages.

Thereafter, when the test voltage Vtest1 lower than the hold voltage Vhold is applied to the lower electrode 15 whose voltage BE is set to the ground voltage Vss at, for example, time t5, the voltage BE abruptly rises between time t5 and time t6 to the test voltage Vtest1. The monitor voltage Vmon=Vhold−Vtest1 is applied between both the electrodes 14 and 15.

After the upper electrode 14 is switched to the high impedance state, the state of the monitor voltage Vmon (=Vhold−Vtest1) between both the electrodes 14 and 15 at the time is secured up to, for example, time t7, and the voltage BE set to the test voltage Vtest1 at the time is switched to the ground voltage Vss.

Thus, the voltage BE abruptly drops between time t7 and time t8 to the ground voltage Vss, and the voltage TE is also dropped according to the capacitance between both the electrodes 14 and 15 by the capacitance coupling. When the electrostatic actuator 10 is placed in the closed state, the amount of drop of the voltage BE is large, whereas when the electrostatic actuator 10 is placed in the open state, the amount of drop thereof is small.

The capacitance between both the electrodes 14 and 15 is measured between time t8 and time t9 based on the amount of the drop, and whether the electrostatic actuator 10 is placed in the open state or in the closed state is determined based on the capacitance. When it is determined that the electrostatic actuator 10 is placed in the closed state at the time, a test voltage, which is higher than the test voltage Vtest1 and as high as the hold voltage Vhold, is applied at, time t9, for example, to the lower electrode 15 to which the ground voltage Vss is applied.

With this operation, the voltage BE abruptly rises, for example, between time t9 and time t10 to the hold voltage Vhold. As a result, the voltage (monitor voltage Vmon) between the upper electrode 14 and the lower electrode 15 is set to zero (0). More specifically, the value of the monitor voltage Vmon changes (decreases) in the negative direction as compared with that applied for the first time.

After the upper electrode 14 is switched to the high impedance state, this state is continued until time t11, for example, and when the voltage BE which is set to the hold voltage Vhold is switched to the ground voltage Vss at time t11, the voltage BE abruptly drops between time t11 and time t12 to the ground voltage Vss. Thereafter, the capacitance of the electrostatic actuator 10 is measured between time t12 and time t13 likewise, and it is determined whether the electrostatic actuator 10 is placed in the open state or in the closed state.

When it is determined again that the electrostatic actuator 10 is placed in the closed state at the time, a test voltage Vtest2 which is higher than the hold voltage Vhold is applied to the lower electrode 15 at, for example, time t13. The voltage of the upper electrode 14 is set to the hold voltage Vhold as it is. As a result, the voltage BE abruptly rises between time t13 and time t14 to the test voltage Vtest2, for example. With this operation, the monitor voltage Vmon between the upper electrode 14 and the lower electrode 15 is set to a negative voltage (Vhold−Vtest2).

After the upper electrode 14 is switched to the high impedance state and this state is continued until, for example, time t15, when the voltage BE is switched to the ground voltage Vss, the voltage BE abruptly drops between time t15 and time t16 to the ground voltage Vss. It is determined whether the electrostatic actuator 10 is placed in the open state or in the closed state by measuring the capacitance of the electrostatic actuator 10 again between time t16 and time t17.

When it is determined again that the electrostatic actuator 10 is placed in the closed state as a result of the measurement, a test voltage Vtest3 which is higher than the test voltage Vtest2 is applied to the lower electrode 15 at, for example, time t17. The voltage of the upper electrode 14 is set to the hold voltage Vhold as it is. As a result, the voltage BE abruptly rises between time t17 and time t18 to the test voltage Vtest3, for example. With this operation, the monitor voltage Vmon between the upper electrode 14 and the lower electrode 15 is set to a negative voltage (Vhold−Vtest3) whose absolute value is larger than that at time t14.

After the upper electrode 14 is switched to the high impedance state, the state is continued up to, for example, time t19, and thereafter it is determined whether the electrostatic actuator 10 is placed in the open state or in the closed state by setting the voltage BE to the ground voltage Vss again. Thereafter, the above voltage application process (i.e., process for applying the test voltage Vtest while gradually increasing the magnitude thereof) is repeated until it is determined that the electrostatic actuator 10 is placed in the open state (until the measured capacitance is set to a value less than a predetermined value). After the electrostatic actuator 10 is placed in the open state, the ground voltage Vss is applied to the voltage BE at, for example, time t19. The electrostatic actuator 10 can be shifted from the closed state to the open state even by the above method.

Note that, in the third embodiment, a control may be started from application of the test voltage Vtest2, which is higher than the hold voltage Vhold, to the lower electrode 15 (from time t13) after the voltage TE of the upper electrode 14 is set to the hold voltage Vhold without applying the test voltage (Vtest1), which is lower than the hold voltage Vhold, to the lower electrode 15 between time t5 and time t12, for example.

As described above, according to the present invention, the state of the electrostatic actuator 10 can be simply and accurately determined and controlled. Note that the present invention is not limited to the embodiments described above, and various modifications, additions, and the like may be made to the present invention within the scope which does not depart from the gist of the present invention. For example, the electrostatic actuator 10 may be controlled by replacing the respective modes such as the types of the voltages applied to the upper electrode 14 and the lower electrode 15, timings at which the voltages are applied, and the like. Although the mode in which the hold voltage Vhold is switched to the monitor voltage Vmon has been explained in the embodiments described above, the operation voltage Vact may be switched to the monitor voltage Vmon.

Although the embodiments of the present invention have been explained above, the present invention is not limited thereto, and various modifications, additions, and the like may be made within the scope which does not depart from the gist of the present invention.

What is claimed is:

1. A method of controlling an electrostatic actuator having a first electrode and a second electrode formed such that they come close to each other when the electrostatic actuator is shifted from an open state to a closed state by electrostatic attraction against elastic force comprising:
    applying an operation voltage between the first electrode and the second electrode to shift the electrostatic actuator from the open state to the closed state;
    applying a hold voltage equal to or less than the operation voltage between the first electrode and the second electrode to keep the closed state of the electrostatic actuator;
    applying a monitor voltage smaller than the hold voltage between the first electrode and the second electrode to determine a trap state of a charge to the first electrode and the second electrode;
    detecting a capacitance between the first electrode and the second electrode when a voltage between the first electrode and the second electrode is switched from the hold voltage to the monitor voltage; and
    performing a predetermined operation based on a result of detection of the capacitance.

2. The method of controlling the electrostatic actuator according to claim 1, wherein when the capacitance is equal to or larger than a certain value, a separation voltage having characteristics opposite to those of the operation voltage is applied to shift the electrostatic actuator from the closed state to the open state.

3. The method of controlling the electrostatic actuator according to claim 1, wherein when the capacitance is equal to or larger than a certain value, the magnitude of the monitor voltage is changed until the capacitance is made less than the certain value and the voltage is applied again between the first electrode and the second electrode, and the capacitance is repeatedly detected.

4. The method of controlling the electrostatic actuator according to claim 2, wherein when the separation voltage is applied, the voltage of the first electrode is kept to the hold voltage, and the voltage of the second electrode is switched to a voltage larger than the hold voltage.

5. The method of controlling the electrostatic actuator according to claim 2, wherein when the separation voltage is applied, the voltage of the first electrode is switched to a ground voltage and the voltage of the second electrode is switched to a predetermined positive voltage.

6. The method of controlling the electrostatic actuator according to claim 1, wherein the capacitance between the first electrode and the second electrode is detected based on the change of a voltage of the first electrode when a voltage applied to the second electrode is changed after the voltage between the first electrode and the second electrode is switched to the monitor voltage and further the first electrode is placed in a high impedance state.

7. The method of controlling the electrostatic actuator according to claim 1, further comprising applying a test voltage larger than a ground voltage between the first electrode and the second electrode, and applying the monitor voltage determined by a potential difference between the hold voltage and the test voltage.

8. The method of controlling the electrostatic actuator according to claim 1, wherein the capacitance between the first electrode and the second electrode is detected by comparing a voltage of the first electrode or the second electrode with a reference voltage.

* * * * *